June 17, 1969  F. W. WRIGHT  3,450,200
HEAT TRANSFER PLATES
Filed Feb. 28, 1967

United States Patent Office 3,450,200
Patented June 17, 1969

3,450,200
HEAT TRANSFER PLATES
Felix William Wright, Crawley, England, assignor to the A.P.V. Company Limited, Crawley, England, a British company
Filed Feb. 28, 1967, Ser. No. 619,440
Claims priority, application Great Britain, Mar. 21, 1966, 12,326/66
Int. Cl. F28f 3/08
U.S. Cl. 165—167          8 Claims

ABSTRACT OF THE DISCLOSURE

The invention comprises an arrangement for sealing the ends of discontinuous gaskets, i.e., gaskets having abutted ends, in plate type heat transfer apparatus. According to the invention, one or more protrusions are formed in the wall of the gasket recess adjacent one or both of the abutted ends to constrict the gasket laterally and compress the abutted ends longitudinally into a firm sealing engagement.

---

This invention relates to plates for heat transfer apparatus such as heat exchangers or evaporators.

In such heat transfer apparatus, heat is transferred between two streams of liquid or one stream of liquid and one stream of vapour or two streams of vapour, the streams being separated by plates assembled in a spaced face-to-face relationship to provide flow channels between the adjacent faces of the plates. The boundaries of the flow spaces are enclosed or sealed by flexible or resilient gaskets surrounding the flow spaces between the adjacent faces and disposed between the adjacent faces.

The gasket is normally of a one-piece construction set within a support groove formed in the plate. The manufacture of the gasket is normally carried out in moulds which are expensive to produce.

The sealing force against the pressure within the plate boundary is obtained by compression of the gaskets in a direction normal to the plate surface.

Considerable expenses could be saved if the gaskets did not have to be moulded in one piece, particularly in large or non-standard sizes, but this entails the formation of the gasket with abutting ends which present a serious leakage problem particularly at high pressures in the flow spaces. Such gaskets are known as discontinuous gaskets.

It is an object of the invention to reduce or eliminate the leakage risk at the abutting ends of a discontinuous gasket.

The invention consists in a heat transfer plate having a gasket recess housing, a discontinuous flexible or resilient gasket having at least one pair of abutting ends, the gasket recess adjacent at least one of the abutting ends being formed to constrict the gasket transversely of the recess whereby the abutting ends are driven into firm engagement with one another.

The invention further consists in heat transfer apparatus comprising a pack of plates according to the invention as set forth above, mounted and assembled in a common frame in spaced face-to-face relationship.

The invention will be further described with reference to the accompanying drawings, which show details of various embodiments of the invention, and in which.

Figure 1:
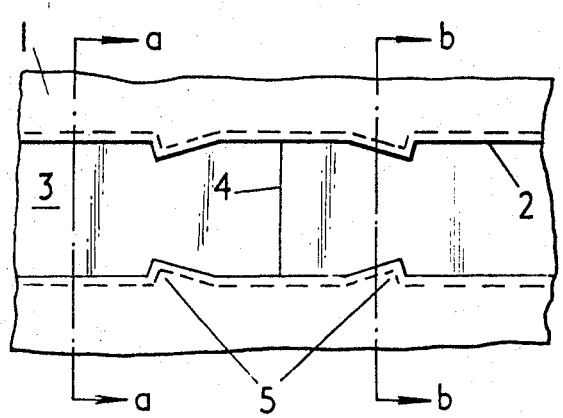
FIGURE 1 is a plan view of the relevant part of a plate according to a first form of the invention.
Figure 2:
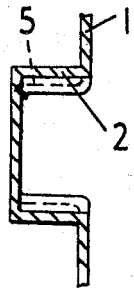
FIGURE 2 is a section on the line a—a of FIGURE 1 with the gasket omitted.
Figure 3:
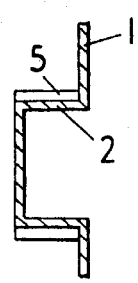
FIGURE 3 is a section on the line b—b of FIGURE 1 with the gasket omitted.

FIGURES 1, 2 and 3 show a portion of the peripheral zone of a plate 1 having a gasket recess 2 in which is housed a discontinuous gasket 3 (omitted from FIGURES 2 and 3) which is a close fit in the recess 2 having ends abutting on a surface 4. FIGURE 1 shows the normal parallel side-walls of the gasket recess containing inward facing depressions 5 reducing the width of the recess as seen in FIGURES 2 and 3. The depressions 5 are near the surface 4 such that they cause additional compression of the gasket so that the ends of the gasket tend to extend towards each other to effect a sound seal over the surface 4.

Figure 4:
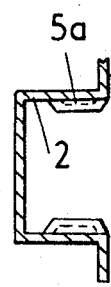
FIGURES 4 to 6 are sections similar to FIGURE 2 showing alternative forms of the invention.

FIGURE 4 shows an alternative form in which the depressions 5a extend only part way down the walls of the gasket recess.

Figure 5:
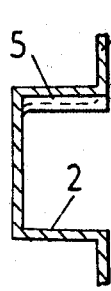

FIGURE 5 shows a form in which only one wall of the gasket recess 2 has a depression 5, the other wall being left undeformed.

Figure 6:
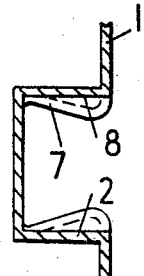

FIGURE 6 shows a form in which the depression is formed with its inner edge wall 7 out of parallel with the side wall 8 of the recess.

Figure 7:
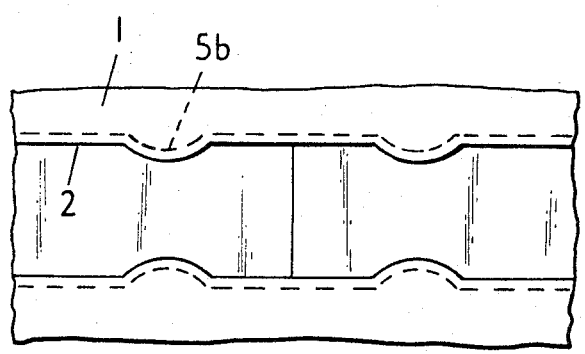
FIGURE 7 is a view similar to FIGURE 1 of a further alternative form.

FIGURE 7 shows that the depressions need not be angular as in FIGURE 1 but may be of rounded form as shown at 5b.

Figure 8:
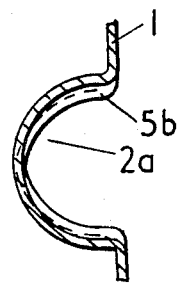
FIGURE 8 is a view similar to FIGURE 2 showing a still further alternative form.

FIGURE 8 shows that the groove 2a may be of a substantially semi-circular form.

Such a groove form can be used in conjunction with any of the depression forms described and illustrated.

Additionally, any of the described depressions may be used singly to cause lateral compression of one end only of the discontinuous sealing strip.

Figure 9:
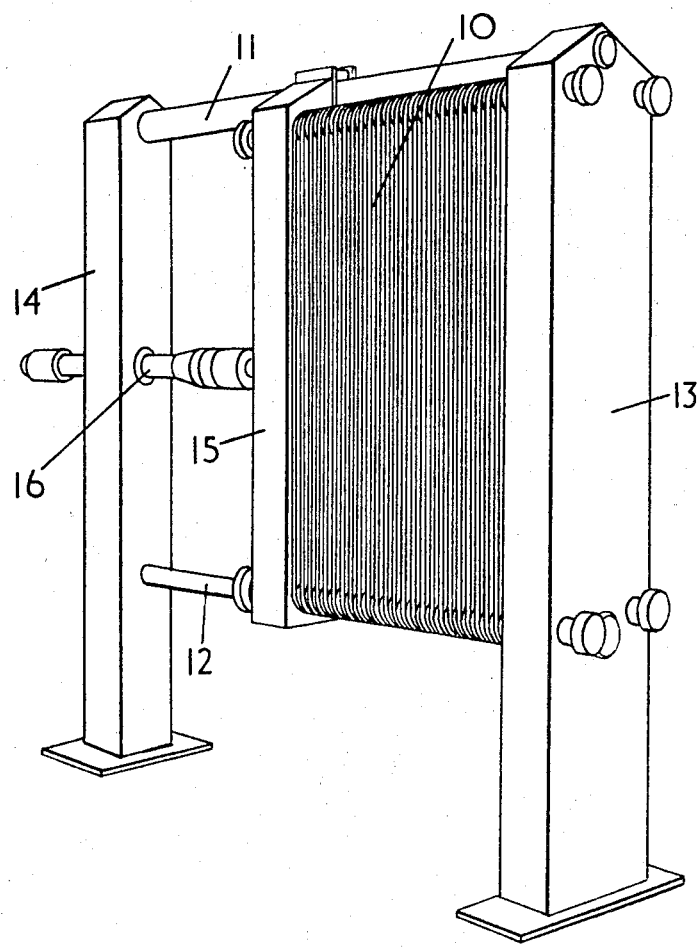
FIGURE 9 is a perspective view of a typical heat exchanger incorporating plates of any of FIGURES 1 to 8 described above.

FIGURE 9 shows a typical heat exchanger comprising a pack of plates 10 hung between a top bar 11 and a bottom bar 12 of a frame, which frame also comprises a head 13, an end support 14 and a follower 15. Means 16 is provided for compressing the pack of plates.

Various modifications may be made within the scope of the invention.

I claim:

1. In a heat transfer plate for assembly into a pack of plates in spaced face to face relationship in a plate type heat exchanger, the plate having a peripheral gasket recess, a discontinuous flexible or resilient gasket fitting snugly in said recess, said gasket having ends abutting each other: the improvement that the gasket recess has at least one protrusion into the gasket at a location adjacent one of the abutting ends of the gasket and extending for at least a major proportion of the depth of the recess to locally constrict the gasket transversely of the recess adjacent the said one end and to compress the said one end longitudinally into firm abutting engagement with the other of the said ends.

2. A heat transfer plate as claimed in claim 1, wherein the recess is provided with transversely constricting protrusions adjacent both abutting ends of the gasket whereby the ends are mutually pressed together.

3. A heat transfer plate is claimed in claim 1, wherein the gasket recess is provided with two opposed protrusions adjacent the said one abutting end.

4. A heat transfer plate as claimed in claim 1, wherein the gasket recess is of generally rectangular cross section with a base and side walls, wherein opposed protrusions are formed in the side walls adjacent the said one abutting end.

5. A heat transfer plate as claimed in claim 4, wherein the said protrusions extend over the whole height of the side walls.

6. A heat transfer plate as claimed in claim 5, wherein the said protrusions are of uniform height over their length.

7. A heat transfer plate as claimed in claim 1, wherein the gasket recess is of arcuate cross section and opposed zones of said arcuate cross section are formed with protrusions for transversely constricting the gasket.

8. In heat transfer apparatus comprising a frame, and a pack of heat transfer plates mounted in spaced face to face relationship in the frame, each plate having a peripheral gasket recess, a discontinuous flexible or resilient gasket fitting snugly in said recess, said gasket having ends abutting each other: the improvement that each gasket recess has at least one protrusion into the gasket at a location adjacent one of the abutting ends of the gasket and extending for at least a major proportion of the depth of the recess to locally constrict the gasket transversely of the recess adjacent the said one end and to compress the said one end longitudinally into firm abutting engagement with the other of the said ends.

References Cited

UNITED STATES PATENTS 2,814,469  11/1957  Hytte _____ 165—167

FOREIGN PATENTS 64,107  11/1945  Denmark.

ROBERT A. O'LEARY, *Primary Examiner.*

T. W. STREULE, *Assistant Examiner.*

U.S. Cl. X.R.

277—235